(12) United States Patent
Anderson et al.

(10) Patent No.: US 6,567,122 B1
(45) Date of Patent: May 20, 2003

(54) METHOD AND SYSTEM FOR HOSTING AN INTERNET WEB SITE ON A DIGITAL CAMERA

(75) Inventors: Eric C. Anderson, San Jose, CA (US); Michael A. Ramirez, Palo Alto, CA (US); Stephen G. Sullivan, Mountain View, CA (US)

(73) Assignee: IPAC Acquisition Subsidiary I, Peterborough, NH (US)

(*) Notice: Subject to any disclaimer, the term of this patent is extended or adjusted under 35 U.S.C. 154(b) by 0 days.

(21) Appl. No.: 09/044,644

(22) Filed: Mar. 18, 1998

(51) Int. Cl.[7] .................. H04N 5/232; H04N 9/04; H04N 7/14; G06F 15/16
(52) U.S. Cl. ............... 348/211.3; 348/207.99; 348/14.01; 709/201; 709/217
(58) Field of Search ................. 348/552, 207, 348/14, 14.03, 207.99, 207.1, 207.11, 211.3, 14.01; 709/201, 217, 219

(56) References Cited

U.S. PATENT DOCUMENTS

| | | | |
|---|---|---|---|
| 5,633,678 A | * 5/1997 | Parulski et al. | 348/232 |
| 5,649,186 A | * 7/1997 | Ferguson | 707/10 |
| 5,999,207 A | * 12/1999 | Rodriguez et al. | 348/14 |
| 6,012,088 A | * 1/2000 | Li et al. | 709/219 |
| 6,035,323 A | * 3/2000 | Narayen et al. | 709/201 |
| 6,163,335 A | * 12/2000 | Barraclough | 348/15 |
| 6,205,485 B1 | * 3/2001 | Kikinis | 709/231 |
| 6,246,430 B1 | * 6/2001 | Peters et al. | 348/14 |
| 6,353,848 B1 | * 3/2002 | Morris | 709/203 |
| 2001/0010543 A1 | * 8/2001 | Ward et al. | 348/207.99 |
| 2001/0014910 A1 | * 8/2001 | Bobo, II | 709/217 |
| 2001/0050711 A1 | * 12/2001 | Karube et al. | 348/220 |

FOREIGN PATENT DOCUMENTS

| | | | |
|---|---|---|---|
| EP | 0 821 522 | 2/1998 | H04N/5/232 |
| EP | 0835011 | 8/1998 | |
| WO | WO 96/02106 | 1/1996 | H04N/5/232 |
| WO | WO 97/38510 | 10/1997 | H04L/12/58 |

OTHER PUBLICATIONS

PATNEWS: What isn't obvious in the patent world? E–Mail correspondence.

* cited by examiner

Primary Examiner—Wendy R. Garber
Assistant Examiner—Lin Ye
(74) Attorney, Agent, or Firm—Sawyer Law Group LLP

(57) ABSTRACT

The present invention comprises a method and system for implementing internet access to images stored in a digital image capture unit including an imaging device and a display. The image capture unit (e.g., a digital camera) is used to capture images and store them within its internal memory. The image capture unit accesses a ID server via the internet and registers its identity and internet address with the web server. A user subsequently accesses the image capture unit by entering the identity of the image capture unit into his web browser. The web browser, using standard internet protocols, then queries the ID server with the identity of the image capture unit and retrieves the internet address. The internet address is subsequently used to access a web page hosted by the image capture unit and display the web page to the user. The web page provides access to the stored images within the image capture unit.

22 Claims, 11 Drawing Sheets

METHOD AND SYSTEM FOR HOSTING AN INTERNET WEB SITE ON A DIGITAL CAMERA

FIELD OF THE INVENTION

The field of the present invention pertains to digital image capture devices. More particularly, the present invention relates to a method and system for using the electronic systems within a digital camera with the internet.

BACKGROUND OF THE INVENTION

Modern digital cameras for taking pictures of scenes and the like typically include an imaging device which is controlled by a computer running a software program. When an image is captured, the imaging device is exposed to light and generates raw image data representing the image. The raw image data is typically stored in a single image buffer where it is then processed and compressed by the processor. Many types of compression schemes are used to compress the image data, with the joint photographic expert group (JPEG) standard being the most popular. After the processor processes and compresses the raw image data into JPEG image files, the processor stores the JPEG image files into an internal memory or on an external memory card.

Some digital cameras are also equipped with a liquid-crystal display (LCD) or other type of display screen on the back of the camera. Through the use of the LCD, the processor can cause the digital camera to operate in one of two modes, play and record, although some cameras only have a record mode. In play mode, the LCD is used as a playback screen for allowing the user to review previously captured images either individually or in arrays of four, nine, or sixteen images. In record mode, the LCD is used as a viewfinder in which the user may view an object or scene before taking a picture.

Besides the LCD, digital camera user interfaces also include a number of buttons or switches for setting the camera into one of the two modes and for navigating between images in play mode. For example, most digital cameras include two buttons labeled "−" and "+" that enable a user to navigate or scroll through captured images. For example, if the user is reviewing images individually, meaning that single images are displayed full-sized in the LCD, pressing one of navigation buttons causes the currently displayed image to be replaced by the next image.

It should be noted that a digital camera has no "film", and as such, there is no incremental cost of taking and storing pictures. Within the confines of memory, the cost taking and storing each additional picture is insignificant. For a given memory size, it is possible to take an unlimited number of pictures, wherein the most recent picture replaces the earliest picture, for virtually zero incremental cost. Accordingly, this advantage is best realized when the camera is used as much as possible, taking pictures of practically anything of interest.

One way to best utilize these unique attributes is to make the digital camera and its internally stored images remotely accessible. If the pictures are remotely accessible, the camera could be set to continuously take pictures of scenes/items of interest. Ideally, a user would be able to access those pictures at any time. The user would be able to use a widely available communications medium to access the camera from virtually an unlimited number of locations.

The emergence of the internet as a distributed, widely accessible communications medium provides a convenient avenue for implementing remote accessibility. Providing remote accessibility via the internet leverages the fact that the internet is becoming increasingly familiar to increasing numbers of people. Many users have become accustomed to retrieving information from remotely located systems via the internet. There are many and varied applications which presently use the internet to provide remote access or remote connectivity. Internet telephony is one such application, such as, for example, Microsoft's NetMeeting and Netscape's CoolTalk.

NetMeeting and CoolTalk are both real-time desktop audio conferencing and data collaboration software applications specifically designed to use the internet as their communications medium. Both software applications allow a "local" user to place a "call" to a "remote" user located anywhere in the world. With both NetMeeting and CoolTalk, the software application is hosted on a personal computer at the user's location and on a personal computer at the remote user's location. Both NetMeeting and CoolTalk require a SLIP (Serial Line Internet Protocol) or PPP (Point-to-Point Protocol) account where internet access is via a dial-up modem, where the user, as is typical, accesses the internet through their respective ISP (internet service provider). Both NetMeeting and CoolTalk require personal computers for the necessary resources for running the applications (e.g., processing power, memory, communications hardware, etc.). In addition, both NetMeeting and CoolTalk require the one user to input an IP (Internet Protocol) address for the other user in order to establish communication between them. To place a call, for example, the local user enters the IP address of the remote user in an appropriate field of the software application and subsequently initiates the call (e.g., by clicking a graphic icon on the personal computer's display), which in turn, establishes communication between the users.

To facilitate the process of obtaining appropriate internet addresses, CoolTalk, for example, allows on-line users to list their respective IP addresses with a proprietary central CoolTalk server. This allows a user to obtain a list of currently on-line users to whom communication can be established. Upon locating the desired remote user in the web server maintained internet address list, the local user places the call.

In this manner, the proprietary central CoolTalk server maintains a user viewable, user updated, "address book" in which users list their respective internet addresses and in which they search for the internet addresses of others with whom they wish to communicate. However, as described above, both NetMeeting and CoolTalk require active user input, in that each require the user to input his current internet address and in that each require the user to search the address book for the internet address of the individual to be contacted. This can be quite problematic in the case where users obtain access to the internet via dial-up connections, and hence, have different internet addresses each time their respective dial-up connections are established.

In a manner similar to internet telephony, internet desktop video conferencing is another application which uses the internet as its communications medium. One such application, for example, is CU-SeeMe, by White Pine. CU-SeeMe provides real time video conferencing between two or more users. As with NetMeeting and CoolTalk, CU-SeeMe is a software application which runs on both the local user's personal computer and the remote user's personal computer. The personal computers provide the resources for running the application. As with NetMeeting and CoolTalk, CU-SeeMe requires the local user to enter the IP address of the remote user. CU-SeeMe also facilitates this process by allowing on-line users to list their respective IP addresses with a proprietary central server such that the addresses can be easily indexed and searched.

Another example of remote access via the internet is status queries of remote devices using the internet as the communications medium. A typical prior art application involves interfacing a remote device with a computer system, and providing access to the computer system via the internet. For example, a vending machine can be remotely accessed to determine its status (e.g., the number of sales made, whether the machine needs refills, whether the machine needs maintenance, etc.). The machine is appropriately equipped with sensors, switches, and the like, which are in turn, interfaced to a computer system using a software driver. The computer system is coupled to the internet and interfaces with the machine through the driver, making the relevant information available over the internet using web server software. Hence, any interested user (e.g., the vending machine service company) is able to remotely ascertain the status of the machine via the internet.

The problem with the above described prior art applications is that access to the internet and communication thereon requires a separate host computer system (e.g., a personal computer). Each of the above described applications (CoolTalk, NetMeeting, and the vending machine examples) require a computer system on both sides of the internet connection. The two computer systems provide the computational resources to host the respective software application, the internet access software, and any necessary device drivers. Because of this, among other reasons, the above applications are not easily transferred to the realm of easy-to-use, intuitive, consumer electronic type devices such as digital cameras. The separate computer systems are expensive.

Another problem is the fact that the above applications require the user to know the internet address of the person (or device, in the vending machine example) being contacted. The internet telephony applications (e.g., CoolTalk) often employ a user viewable, user updated, address book to facilitate the process of locating and obtaining the correct internet address, however, they require active user input. This is difficult in the case where users obtain access to the internet via dial-up connections, and thus, have changing internet addresses.

In addition, both CoolTalk and NetMeeting operate on top of the computer's operating system, which is notoriously difficult and obtuse to novice users.

Thus, what is required is an inexpensive method implementing remote access via the internet for digital cameras. If internet remote accessibility is relatively inexpensive, a large installed base of remotely accessible digital cameras will rapidly develop. This will give rise to many different applications and enhancements being developed, which in turn, will lead to even greater demand for, and use of, remotely accessible digital cameras. What is further required is an intuitive, easy to use interface for presenting the digital camera's functionality and capabilities to users. Additionally, what is required is an efficient, user transparent, process of obtaining the internet address of a digital camera, where the camera accesses the internet via a dialup connection, and thus, has a changing internet address. The present invention provides a novel solution to the above requirements.

SUMMARY OF THE INVENTION

The present invention provides a method for making a digital camera and its internally stored images remotely accessible. The present invention enables the digital camera to be set to continuously take pictures of scenes/items of interest and allow a user to access those pictures at any time. The present invention implements remote accessibility via the internet. This allows the both the user and the digital camera to communicate from virtually an unlimited number of locations. Hence, both the user and the camera are portable, requiring only an internet connection at any location to implement remote access. The present invention also provides an efficient, user transparent, process of obtaining the internet address of a digital camera, where the camera accesses the internet via a dial-up connection, and thus, has a changing internet address.

A digital camera in accordance with the present invention does not require a separate, external computer system (e.g., a personal computer) for internet connectivity, thus providing an inexpensive method for making remotely accessible digital cameras widely available.

In addition, a digital camera in accordance with the present invention is accessed via the widely used, very familiar web browser. By functioning with typical, widely used web browsers, the present invention provides a simple, intuitive, and familiar interface for accessing the digital camera's functionality. Accordingly, the digital camera's controls and functions are intuitively easy to utilize, without requiring a extensive learning period for new users. For example, a consumer purchasing a remotely accessible camera is typically able to easily and immediately use the remote accessibility functions with minimal set-up.

In one embodiment, the present invention comprises a method and system for implementing internet access to images stored in a digital camera including an imaging device and a display. The digital camera (e.g., or similar image capture unit) is used to capture images and store them within its internal memory. The digital camera accesses a ID server via the internet and registers its identity and internet address with the web server.

A user wishing to view the image (e.g., the camera's owner or any other user) subsequently enters the identity of the digital camera into his web browser (e.g., the camera's URL). Using standard internet protocols, the ID server is queried with the URL of the digital camera and returns the digital camera's current internet address. The user's web browser then accesses the digital camera using the camera's current internet address returned from the ID server, and views web pages hosted by the camera. This process of retrieving the current internet address of the digital camera from the ID server occurs transparently with respect to the user. The web page provides access to the stored images within the digital camera. By functioning with typical, widely used web browsers, the digital camera of the present invention provides a simple, intuitive, and familiar interface for accessing the digital camera's functionality. And by implementing remote accessibility via the internet, the present invention allows access to the digital camera from virtually an unlimited number of locations.

BRIEF DESCRIPTION OF THE DRAWINGS

The present invention is illustrated by way of example and not by way of limitation, in the figures of the accompanying drawings in which like reference numerals refer to similar elements and in which.

DETAILED DESCRIPTION OF THE INVENTION

In the following detailed description of the present invention, numerous specific details are set forth in order to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention provides a method for making a digital camera and its internally stored images remotely accessible by hosting an internet web site on the digital camera. The present invention enables the digital camera to be set to continuously take pictures of scenes/items of interest and allow a user to access those pictures at any time. The present invention implements remote accessibility via the internet, thus allowing the user to access the digital camera from virtually an unlimited number of locations.

A digital camera in accordance with the present invention does not require a separate, external computer system (e.g., a personal computer) for internet connectivity, thus providing an inexpensive method for making remotely accessible digital cameras widely available. In addition, a digital camera in accordance with the present invention is accessed via the widely used, very familiar web browser. By functioning with typical, widely used web browsers, the present invention provides a simple, intuitive, and familiar interface for accessing the digital camera's functionality. In so doing, the controls and functions of the digital camera are intuitively easy to utilize, and do not require an extensive learning period for new users. These and other benefits of the present invention are described in greater detail below.

Figure 1:
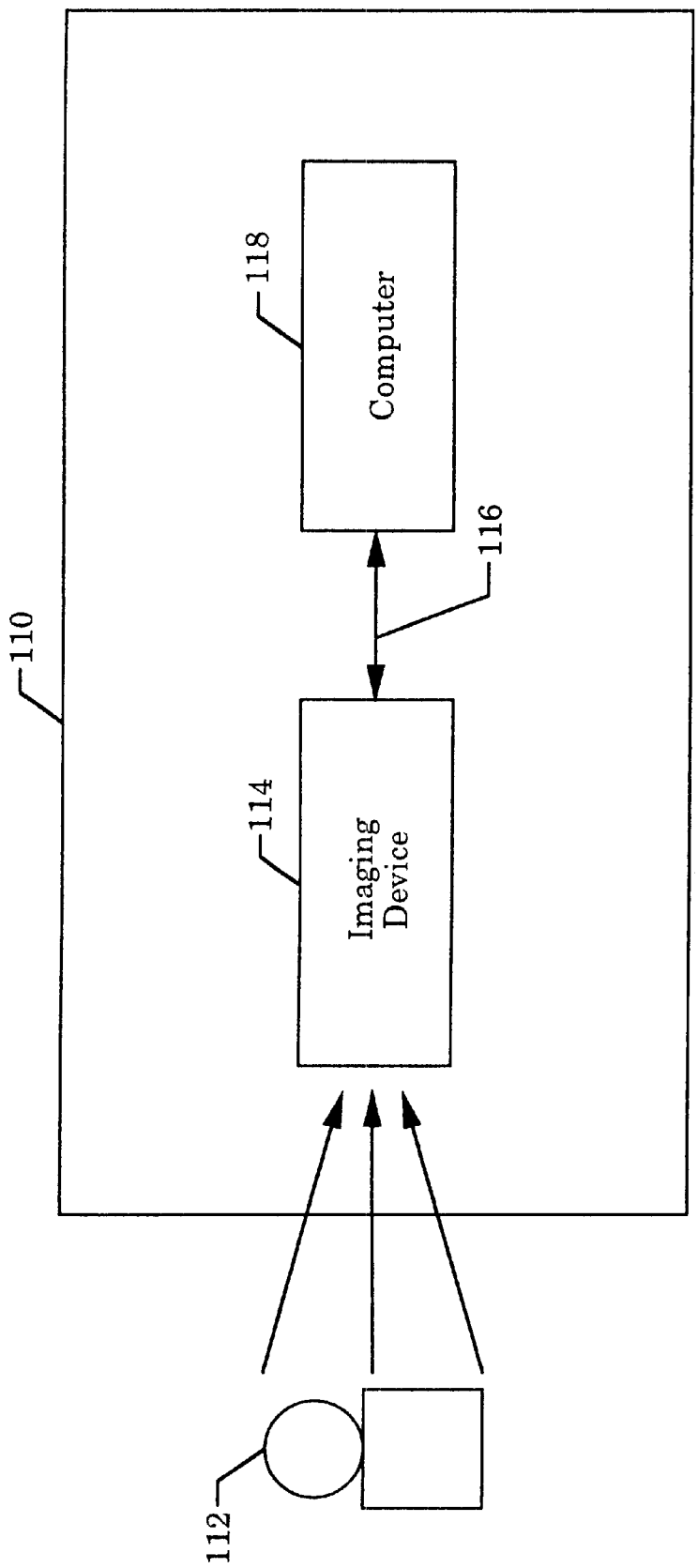
FIG. 1 shows a block diagram of a digital camera for use in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
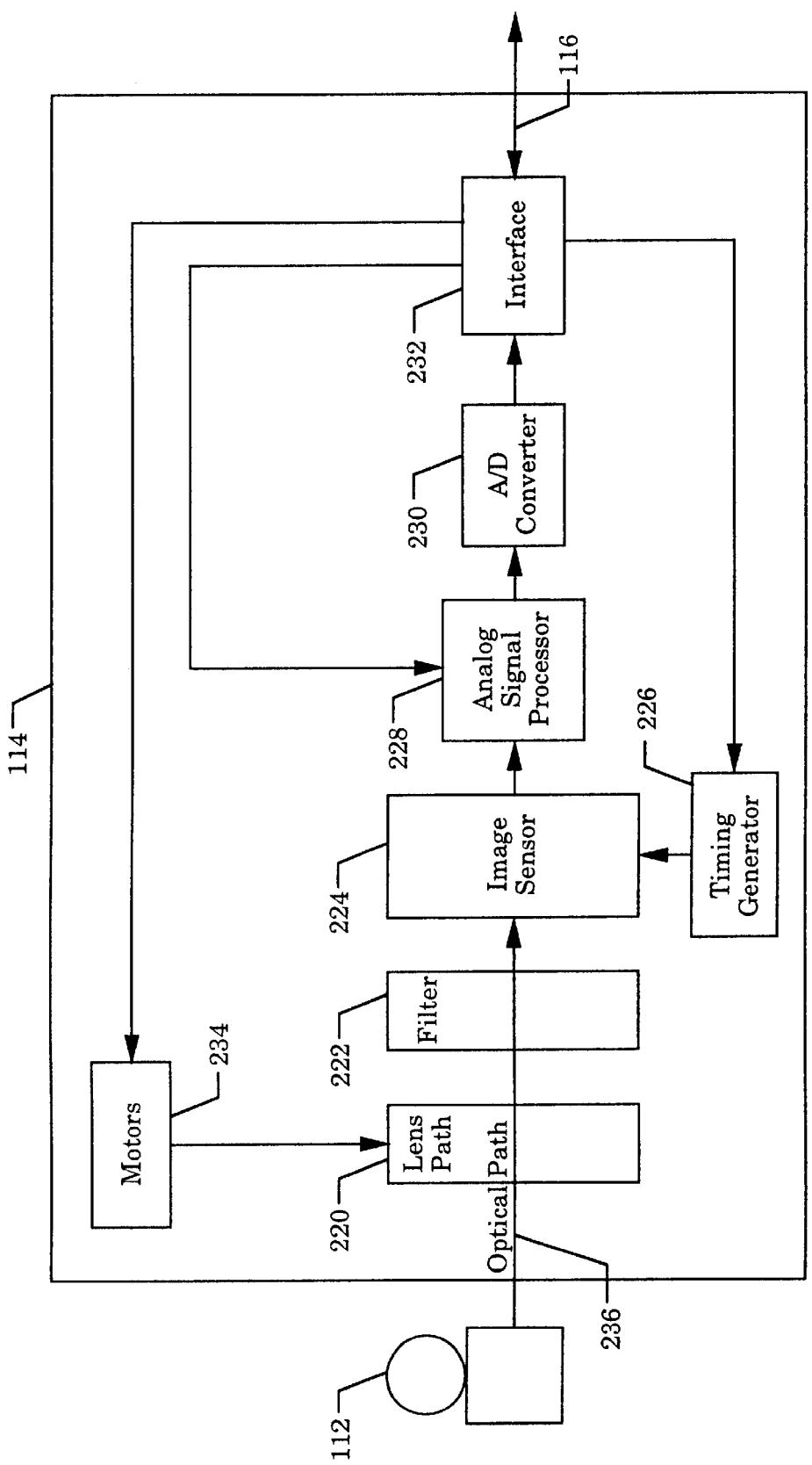
FIG. 2 shows a block diagram of an imaging device in accordance with one preferred embodiment of the present invention.

Referring now to FIG. 2, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
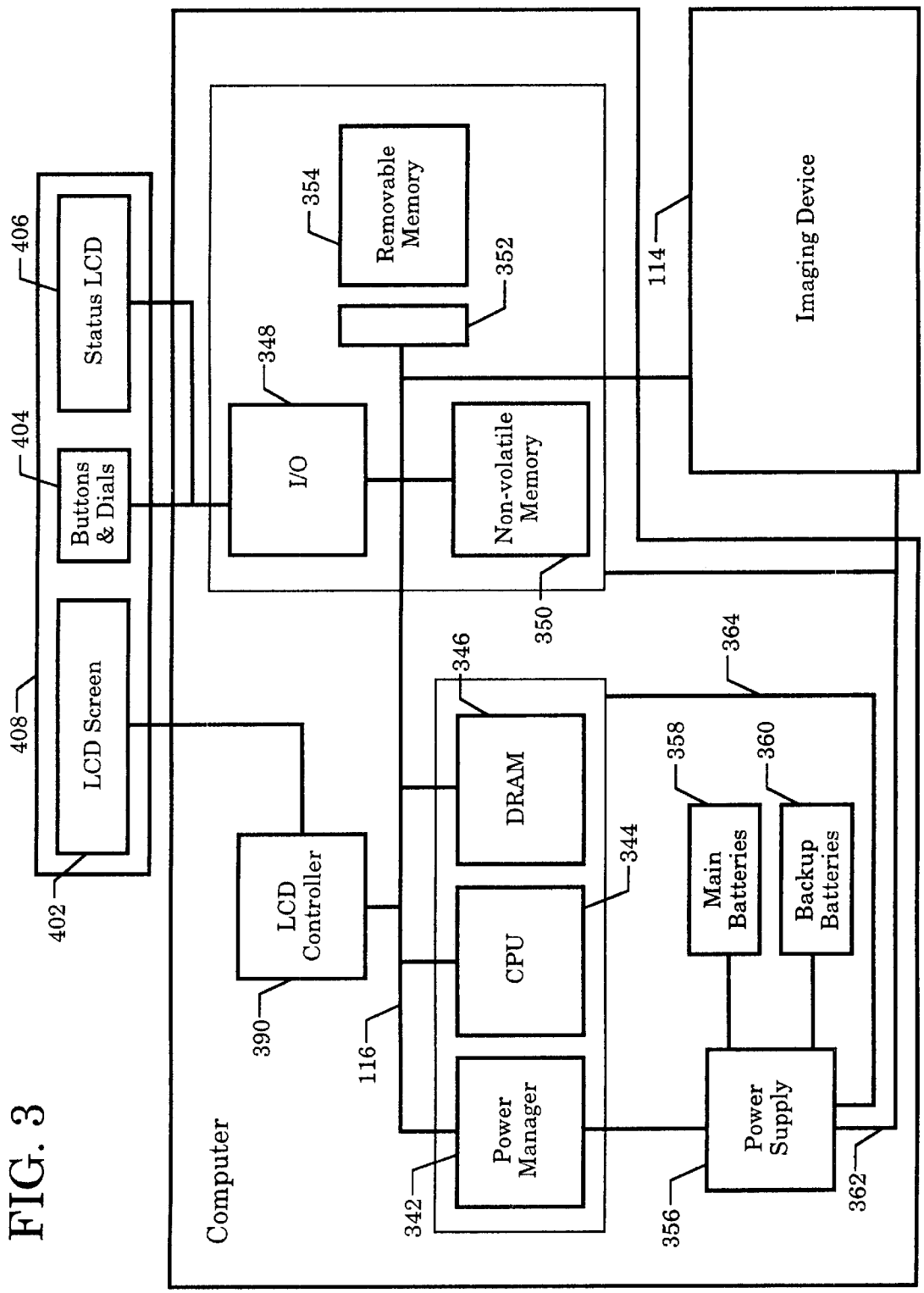
FIG. 3 shows a block diagram of a computer in accordance with one preferred embodiment of the present invention.

Referring now to FIG. 3, a block diagram of one preferred embodiment for computer. 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector. 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110.within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
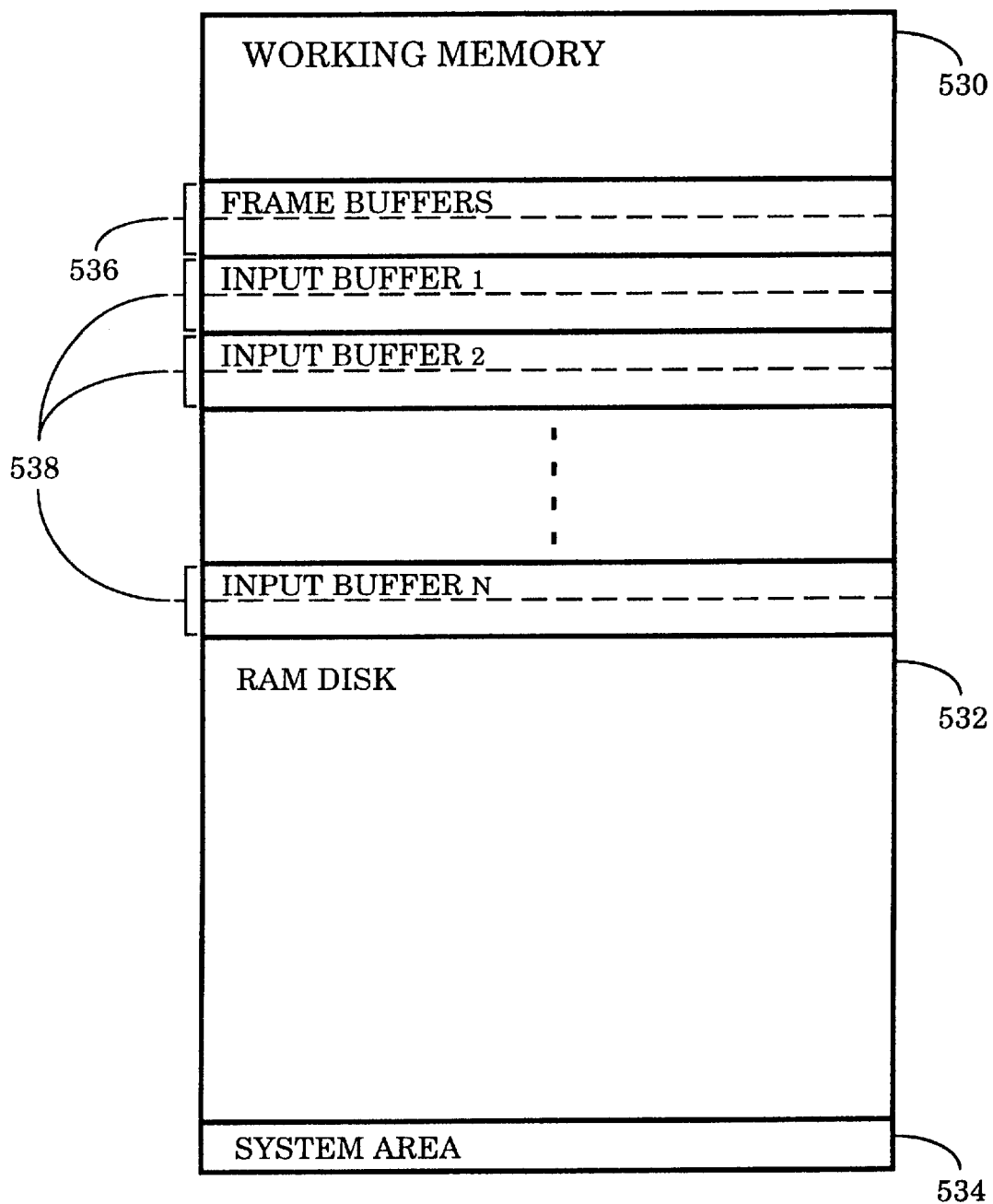
FIG. 4 shows a memory map of a DRAM in accordance with one embodiment of the present invention.

Referring now to FIG. 4, one embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers 538 for temporarily storing sets of raw image data received from imaging device 114, and a frame buffer 536 for storing data for display on the LCD screen 402. In a preferred embodiment, each input buffer 538 and the frame buffer 536 are split into two separate buffers (shown by the dashed lines) to improve the display speed of the digital camera and to prevent the tearing of the image in the display 402.

Figure 5A:
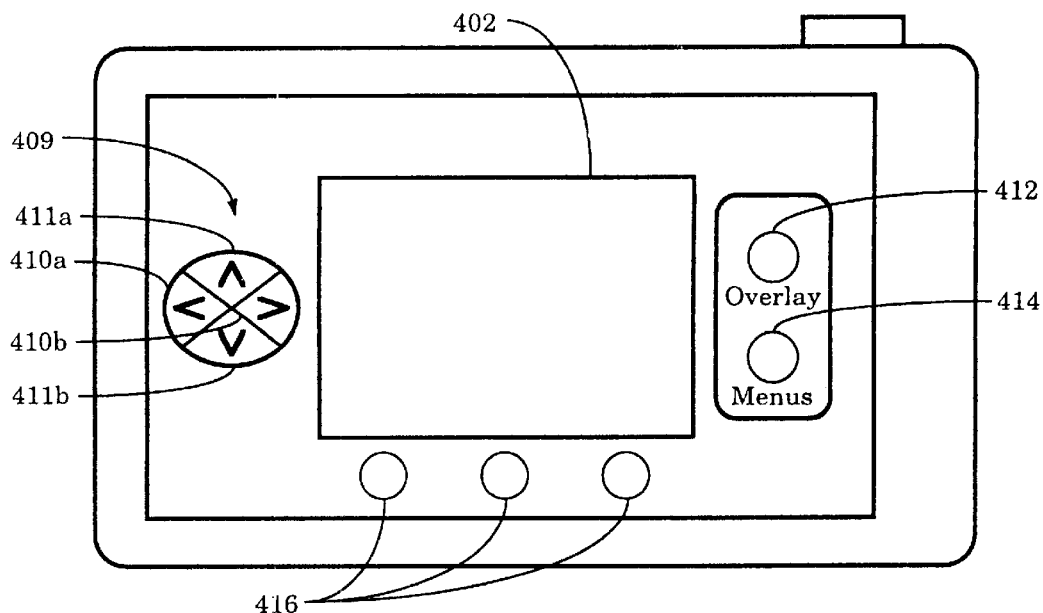
FIG. 5A shows a top view diagram depicting the preferred hardware components of the camera from FIG. 1.
Figure 5B:
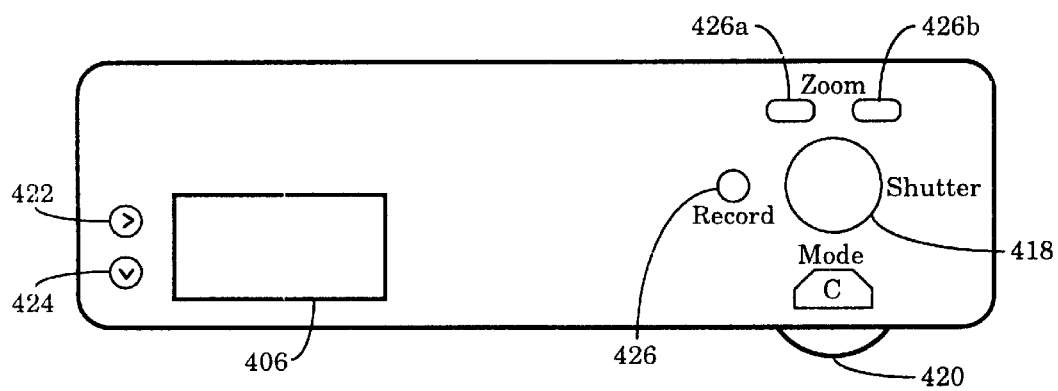
FIG. 5B shows a back view diagram depicting the preferred hardware components of the camera from FIG. 1.

FIGS. 5A and 5B are diagrams depicting the preferred hardware components of the camera's 110 user interface 408. FIG. 5A is back view of the camera 110 showing the LCD screen 402, a four-way navigation control button 409, an overlay button 412, a menu button 414, and a set of programmable soft keys 416. FIG. 5B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

In the present embodiment, the digital camera is provided with several different operating modes for supporting various camera functions. In capture mode, the camera 100 supports the actions of preparing to capture an image, and capturing an image through the use of either the LCD screen 402 alone or the status LCD 406 with the aid of an optional optical viewfinder (not shown). In review mode, the camera 100 supports the actions of reviewing camera contents, editing and sorting images, and printing and transferring images. In play mode, the camera 100 allows the user to view screen-sized images in the LCD screen 402 in the orientation that the image was captured. Play mode also allows the user to hear recorded sound associated to a displayed image, and to play back sequential groupings of images, which may comprise time lapse, slide show, and burst image images. The user preferably switches between the capture, review, and play modes, using the mode dial 420. When the camera is placed into a particular mode, that mode's default screen appears in the LCD screen 402 in which a set of mode-specific items, such as images, icons, and text, are displayed. Although the digital camera includes multiple operating modes, the mode relevant to this description is capture (record) mode.

Figure 6:
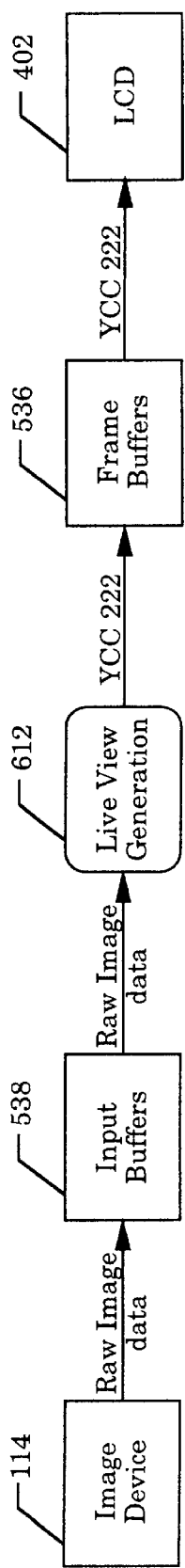
FIG. 6 shows a block diagram of a live view generation process in accordance with one embodiment of the present invention.

Referring now to FIG. 6, in a preferred embodiment, the processing is performed by a live view generation process 612, which is stored in non-volatile memory 350 and executed on CPU 344. However, the image processing can also be implemented using hardware. During the execution of the live view generation process 612, the CPU 344 takes the raw image data from the input buffers 538 and performs image processing and color space conversion. Image processing steps can include, for example, gamma correction, white balance, and color correction. The conversion process performs gamma correction and converts the raw CCD data into either a RGB or YCC color format which is compatible with the LCD screen 402. (RGB is an abbreviation for Red, Green, Blue, and YCC is an abbreviation for Luminance, Chrominance-red and Chrominance- blue). After converting the data to YCC, the YCC image data is stored in the frame buffer 536. The contents of the frame buffer 536 are then displayed onto the LCD screen 402. Although FIG. 6 shows the YCC data being displayed on LCD 402, it should be appreciated that the present invention is not limited to functioning only with LCD equipped digital cameras.

Figure 7:
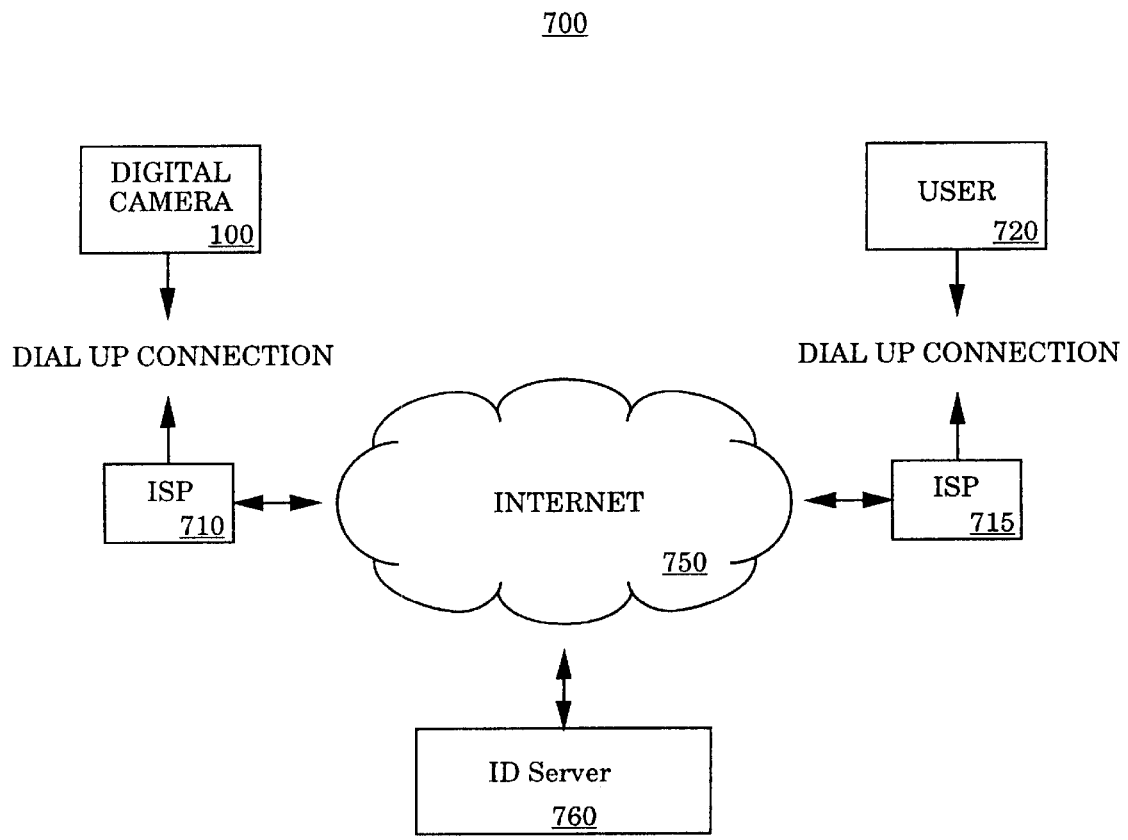
FIG. 7 shows a block diagram of a remote access system in accordance with one embodiment of the present invention.

Referring now to FIG. 7, a block diagram of a remote access system 700 in accordance with one embodiment of the present invention is shown. System 700 includes camera 100, internet service provider (ISP) 710, internet service provider 715, and user 720. ISP 710 and ISP 715 are both directly coupled to the internet 750. System 700 also includes a ID server 760. In the present embodiment, ID server 760 includes the functionality of a domain name server.

ID server 760 functions in part by facilitating the process of locating appropriate internet addresses. As is well known in the art, web sites are found and web pages are accessed on the internet 750 via their internet addresses. URLs refer to corresponding internet addresses. The URLs are the universal naming scheme for identifying and locating all web resources. URLs, or internet addresses, fully describe where a particular resource (e.g., a web page) resides and how to access it. Using well known internet techniques (e.g., hypertext transfer protocol), resources which exist in "internet space" are located and accessed via their internet addresses.

There is a problem, however, in that each time camera 100 dials up and connects to internet 750 via ISP 710, it typically is assigned a different internet address.

In the case of dial-up internet access, the actual internet address is not assigned by ISP 710 until the device actually establishes an internet connection. The internet address typically changes each time camera 100 establishes an internet connection. Thus, for any particular session, when user 720 attempts to access camera 100 via the internet 750, wherein camera 100 is connected to the internet 750 (e.g., via a dial-up connection) user 720 will not know the correct internet address. ID server 760, in accordance with the present invention, overcomes this unknown address problem and allows access to the digital camera (e.g., digital camera 100), which inexpensively hosts a web site, as described further below. ID server 760 is further described in the discussion of FIG. 10 below.

With reference still to FIG. 7, process 700 of the present invention provides a method which implements remote access to camera 100 and its internally stored images. In the present embodiment, camera 100 is coupled to the internet 750 via a dial up connection to ISP 710. The dial up connection is via a POTS (plain old telephone system) telephone line. Digital camera 100 accesses ISP 710 using a modem, coupling to one of a bank of modems maintained on the premises of ISP 710. ISP 710 is in turn coupled directly to the internet 750 via an all-digital connection (e.g., T1 line).

Similarly, user 720 is coupled to ISP 715 via a POTS dial up connection and is likewise coupled to the internet 750 via one of a bank of modems maintained on the premises of ISP 715. As with ISP 710, ISP 715 is coupled directly to the internet via an all-digital connection. User 720 accesses the internet 750 using a web browser (not shown) running on any one of a variety of devices (e.g., personal computer, wireless PCS phone, network computer, television set top box, etc.).

Camera 100 accesses ID server 760 via the internet 750 and registers its identity and internet address. ID server 760 maintains an internal database of "on-line" devices and their associated internet addresses. User 720, or any other user wishing to access the camera (e.g., the camera owner's friends or relatives) subsequently enters the identity of camera 100 into his web browser (e.g., camera 100's URL). Using standard internet protocols, ID server 760 is queried with the URL of camera 100 and returns the camera 100's current internet address. The user 720's web browser then accesses camera 100 using the current internet address returned from ID server 760.

After the current internet address of camera 100 is returned from ID server 760, user 720's web browser access camera 100 to retrieve a web page. The web browser embeds the internet address inside the HTTP (Hyper Text Transfer Protocol) request and sends the request, along with some status information, to a web server application hosted by camera 100 (e.g., server application 910 shown in FIG. 9). Web server application 910 receives the HTTP request and establishes a socket connection between user 720's web browser and web server application 910. Web server application 910 subsequently fetches the requested HTML (Hyper Text Mark-up Language) file and sends it back to the web browser and closes the socket connection. The web browser then interprets the HTML commands and displays the resulting web page. The process of accessing an HTML file from a web server is commonly referred to as accessing a web page. Similarly, the process of sending HTML files from a web server to a web browser is commonly referred to as sending a web page, and hosting the web server which sends the web page is often referred to as hosting the web page.

This process of retrieving the current internet address of camera 100 from ID server 760 occurs transparently with respect to user 720. In a typical case, for example, user 720 types the URL for camera 100 into his web browser and hits enter. In accordance with the present invention, the next web page the user views is the web page returned from camera 100. Beyond entering the URL for camera 100, no further action from the user is required in order to access the web pages hosted by camera 100.

Web server application 910 (FIG. 9) hosted by camera 100 provides access to the stored images via the web pages. For example, requested images are embedded within the web pages which are sent to user 720's web browser. And user 720's web browser requests images or issues commands to camera 100, by embedding them within the status information included within the HTTP requests issued from the web browser to web server application 910 hosted by camera 100. By implementing remote accessibility via the internet 750, access to camera 100 can be obtained from virtually an unlimited number of locations. For example, camera 100 can be set to continuously take pictures of scenes/items of interest and allow user 720 to access those pictures at any time. Camera 100 and web server application 910 hosted thereon are further described in the discussion of FIG. 9 below.

Referring still to FIG. 7, it should be appreciated that camera 100, in accordance with the present invention, does not require a separate, external computer system (e.g., a personal computer) for connecting to ISP 710, thus providing an inexpensive method for making remotely accessible cameras widely available. It should be further appreciated that while process 700 shows camera 100 coupling to internet 750 via one ISP (e.g., ISP 710) and user 720 coupling to internet 750 via a separate ISP (e.g., ISP 715), user 720 and camera 100 could be coupled to internet 750 through a single ISP. In such a case, user 720 and camera 100 would be coupled to two separate access ports (e.g., two separate modems out of a bank of modems) of the same ISP.

In addition, camera 100 is accessed via the widely used, very familiar web browser. By functioning with a web page based interface and widely used web browsers, the present invention provides a simple, intuitive, and familiar interface for accessing camera 100's functionality. Accordingly, camera 100's controls and functions are intuitively easy to utilize. Since web pages and their associated controls (e.g., push buttons, data entry fields, etc.) are very familiar to most users, the remote access functionality of camera 100 can be utilized without requiring a extensive learning period for new users. For example, a consumer purchasing a remotely accessible camera is typically able to easily and immediately use the remote accessibility functions with minimal set-up.

As described above, the remote accessibility of camera 100 provides for many new applications of digital imagery. One such application involves setting up camera 100 at some remote location and using it to take pictures at successive intervals. These pictures would be accessed via the internet 750 as they are taken. The interval can be adjusted (e.g., more or less pictures per minute) in response to user 720 entered commands via a Web browser. In such an application the limited memory (e.g., DRAM 346 and removable memory 354 of FIG. 3) of camera 100 would be used to hold a desired number of pictures at a specified resolution. The memory would function as a sort of FIFO, wherein a fixed number of pictures are stored, the latest picture replacing the earliest picture.

Another application involves using camera 100 in conjunction with a motion detector. When used in conjunction with a motion detector, camera 100 can be configured to capture an image in response to receiving a signal from the motion detector (e.g., detecting the motion of an intruder), thereby taking a picture of whatever triggered the detector's signal output. Alternatively, camera 100 can detect motion by simply comparing successive images to detect changes between them, thereby dispensing with the need for a separate motion detector. The camera can additionally be configured to notify user 720 (e.g., via an email) to access and view the image of the potential intruder.

Yet another application involves using camera 100 in conjunction with a remote aiming device. Camera 100 can be mounted on a remotely operated aiming device (e.g., a motorized tripod). The aiming device is controlled via the internet 750 in the same manner the camera is controlled via the internet 750. Alternatively, camera 100 could be coupled to control the remote aiming device directly, via a software routine executing on computer 118 (shown in FIG. 1). The remote aiming device allows user 720 to control the field of view of the camera 100 in the same manner user 720 controls other functionality (e.g., picture resolution, picture interval, etc.). User 720 can position the camera to take pictures of objects in the camera's vicinity.

In this manner, system 700 of the present invention is able to implement sophisticated remote surveillance of the type previously performed by expensive, prior art closed circuit television devices. Unlike the prior art, however, system 700 is inexpensive and relatively simple to implement.

For example, to achieve the same functionality as system 700 with a prior art personal computer in place of camera 100, custom-designed software would have to be written to host a web server on the personal computer. This software would have to function in conjunction with the operating system software of the personal computer. This, in turn, leads to a large amount of complexity and difficulty configuring and maintaining the personal computer/software. In addition to the personal computer, an external imaging device would also be required. Hence, the personal computer becomes a very expensive, dedicated platform for hosting the web server.

In contrast, camera 100 of system 700 includes the necessary software and the necessary computational resources (e.g., computer 118) to host the web page itself, eliminating the requirement for the expensive personal computer. In so doing, remote viewing, remote surveillance, a remote picture taking operations are made much more usable and much more obtainable to the average user. This "web site enabled" camera greatly reduces the cost of achieving the above functionality. The reduced cost will lead to wide adoption and deployment of the present invention, which will in turn, lead to a large number of new applications and new software written to take advantage of the resulting installed based of low-cost internet enabled, remotely accessible cameras of the present invention.

Figure 8:
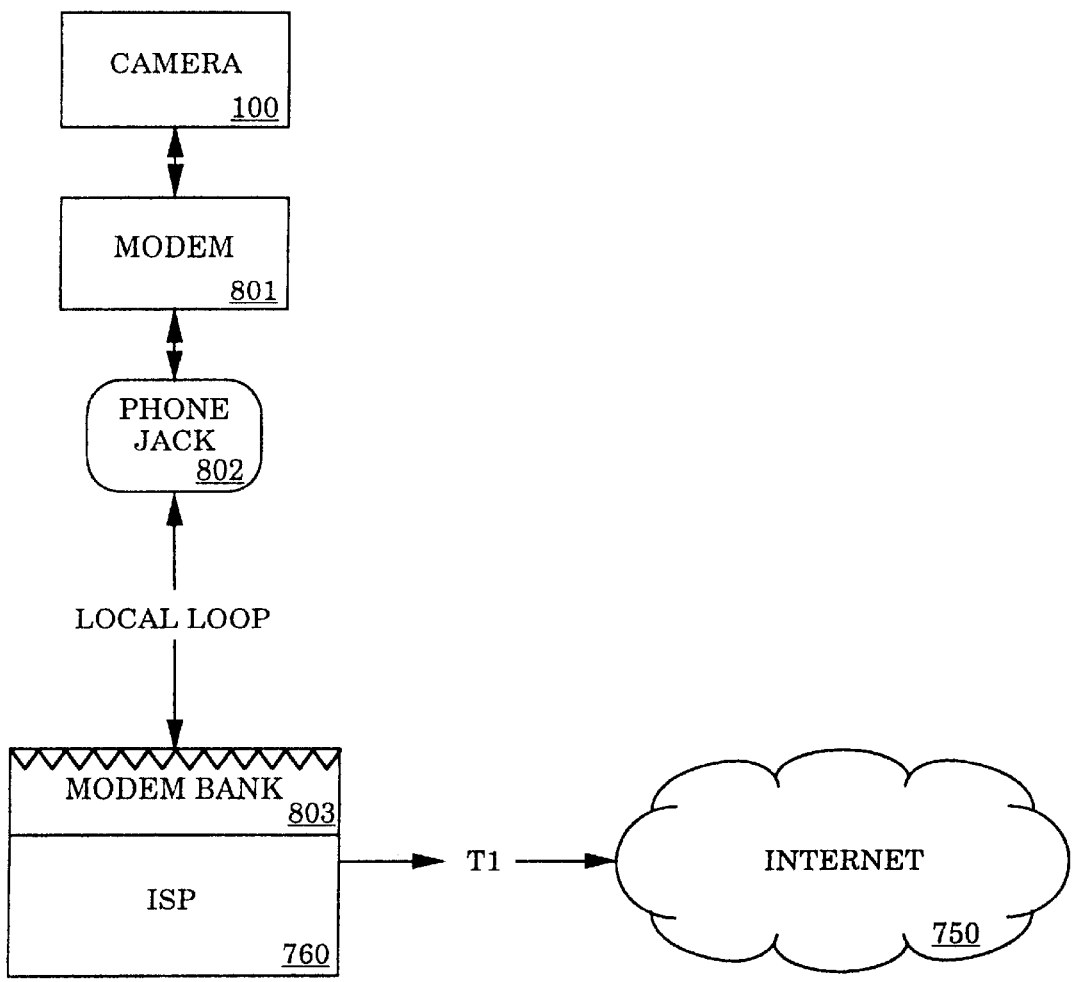
FIG. 8 shows a block diagram of the digital camera from FIG. 7 coupled to the internet via an internet service provider.

Referring now to FIG. 8, a more detailed diagram 800 of camera 100 coupled to internet 750 is shown. Diagram 800 shows camera 100 coupled to an external modem 801. Camera 100 is coupled to modem 801 via any of several communications means (e.g., USB, IEEE1394, infrared link, etc.). Modem 801 is in turn coupled to a POTS telephone jack 802 at the camera's location. The telephone jack 802 couples modem 801 to one of the modems 803 of ISP 710 via the telephone companies local loop. ISP 760, as described above, is directly coupled to the internet 750 via a T1 line.

Modem 801 is shown as an external modem. However, the functionality of modem 810 can be implemented directly within the electronics of camera 100 (e.g., via a modem ASIC), or alternatively, can be implemented as a software only modem executing on computer 118 within camera 100. As such, it should be appreciated that, at the hardware connectivity level, modem 801 can take several forms. For example, a wireless modem can be used in which case the camera is not connected via an external wire to any land line. Alternatively, there may even be applications in which camera 100 includes suitable electronic components enabling a connection to a conventional computer system network (e.g., ethernet, Apple talk, etc.), which is in turn, directly connected to the internet (e.g., via a gateway, a firewall, etc.), thereby doing away with the requirement for an ISP. Hence, it should be appreciated that the present invention is not limited to any particular method of accessing the internet 750.

Figure 9:
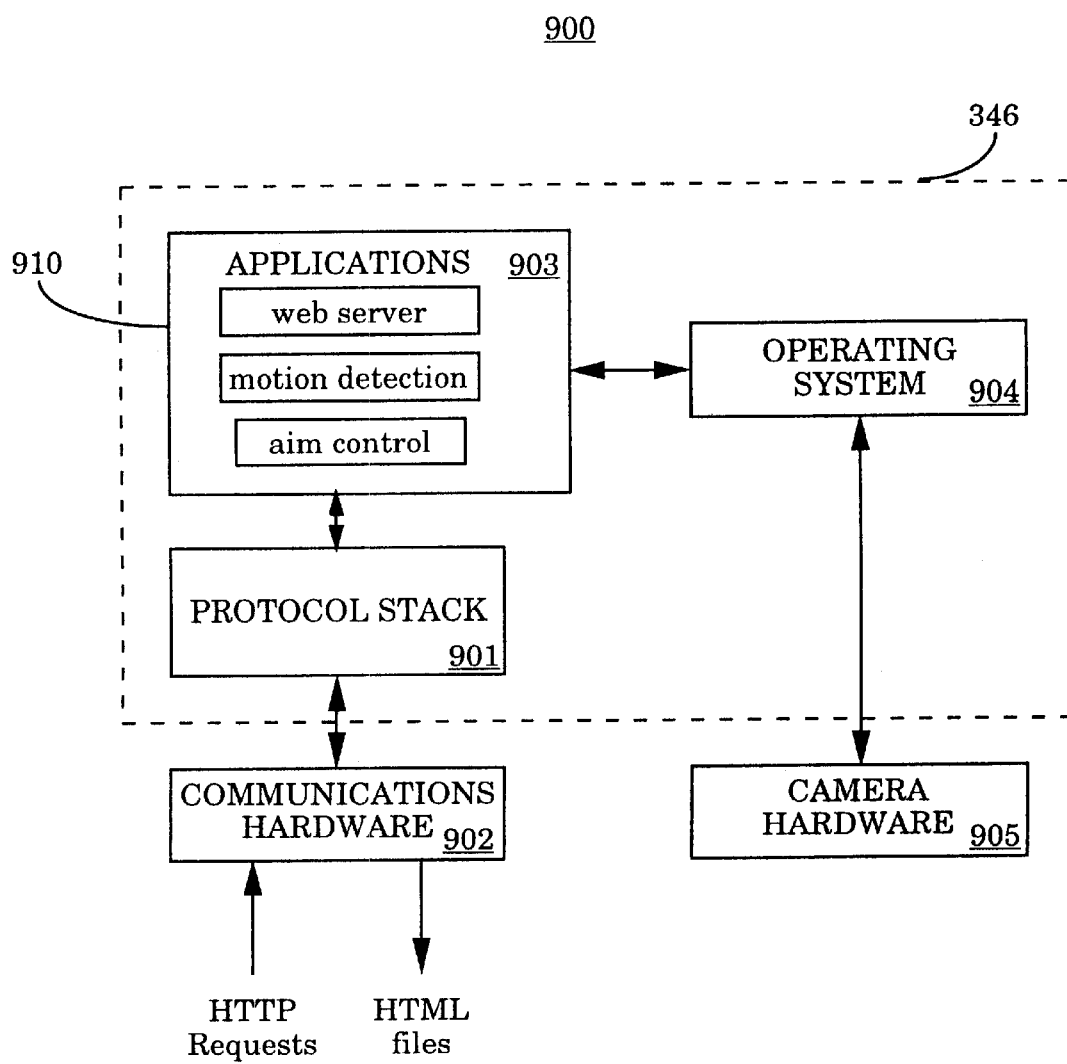
FIG. 9 shows a diagram of the connectivity and application software of a digital camera in accordance with one embodiment of the present invention.

Referring now to FIG. 9, a diagram 900 of the connectivity and application software of camera 100 is shown. At the software level, computer 118 of camera 100 hosts a TCP-IP protocol stack 901 (including PPP (Point to Point Protocol)), which, as is well-known in the art, enables communication via the internet. Protocol stack 901 interfaces with the physical connection hardware 902 of camera 100 and the application layer 903. The bottom of protocol stack 901 includes communication hardware interface drivers which interfaces directly with the various communications hardware camera 100 must function with (e.g., USB, IEEE1394, etc.). The top of protocol stack 901 includes software APIs and protocol libraries which interface with web server application 910 running in an applications layer 903. Applications layer 903 interfaces with an operating system 904. Applications layer 903, protocol stack 901, and operating system 904 are instantiated as software modules in DRAM 346 of camera 100.

The web server application 910 runs within applications layer 903, along with other software applications which provide camera 100's functionality (e.g., still image downloading, motion detection, aim control for a remote aiming device, and the like). The web server application 910 responds to queries from the user's internet web browser and other web browsers, which include user requests and user commands directed to the camera (e.g., taking the picture, changing the picture taking interval, etc.) and communicates with other software applications within applications layer 903. These applications each communicate with operating system 904 of the camera 100, which controls the functionality of camera 100 (e.g., taking pictures, storing pictures, and the like). HTTP requests are received and HTML files are transferred to and from the web server application 910 via protocol stack 901, and communications hardware 902.

Figure 10:
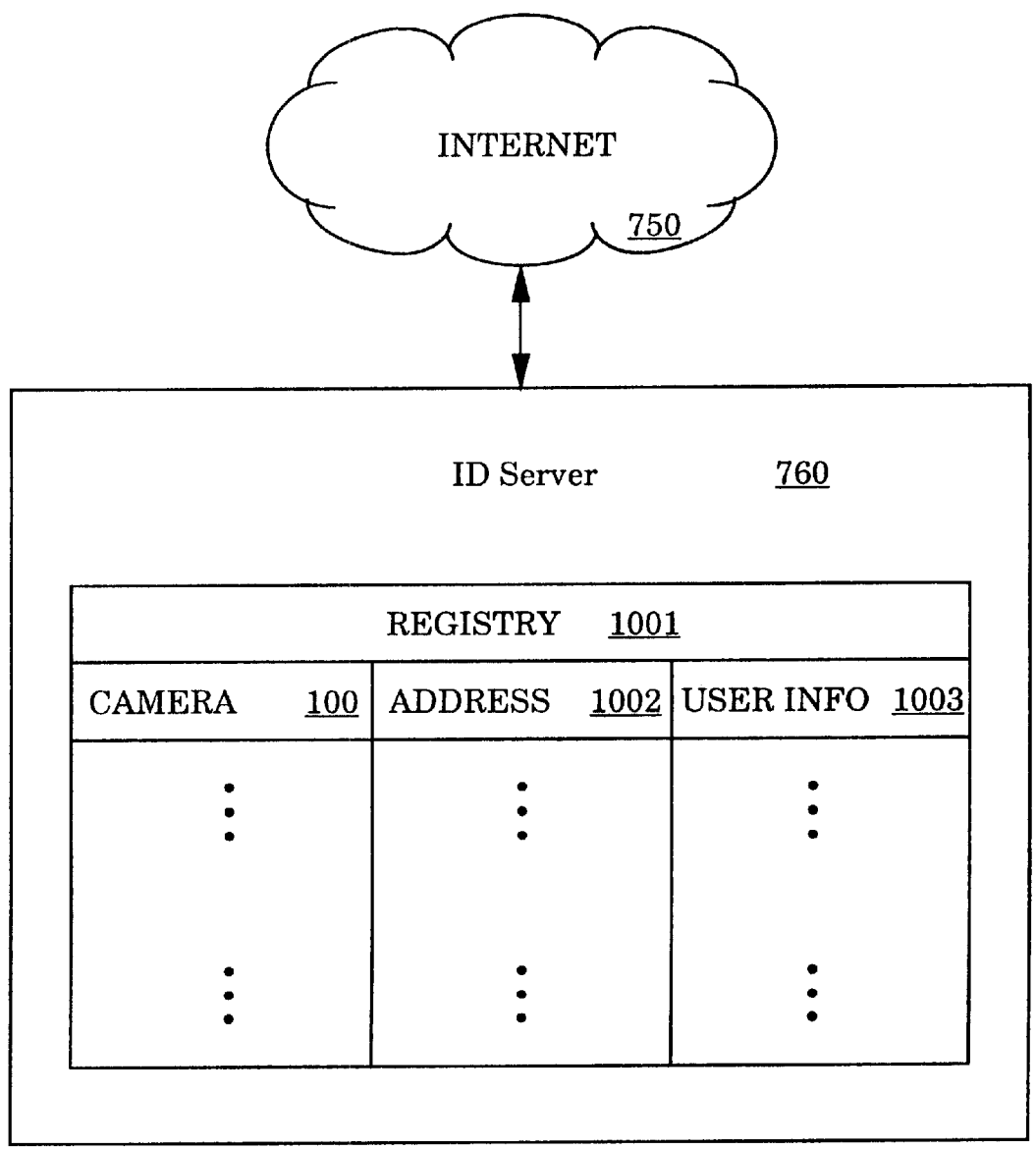
FIG. 10 shows a more detailed diagram of the domain name server from FIG. 7.

With reference now to FIG. 10, a more detailed diagram of ID server 760 is shown. As described above, ID server 760, in accordance with the present invention, overcomes the unknown address problem, wherein the internet address of camera 100 changes each time it establishes a connection. ID server 760 solves this problem by maintaining a registry 1001 of relevant internet addresses. Registry 1001 solves the unknown address problem by cataloging a device's unique identifier (e.g., camera 100), the address of the device (e.g., address 1002), and any relevant user information (e.g., user info 1003).

In the present embodiment, the registry is a software data structure residing in ID server 760. ID server 760 has an internet address which is known by both the device and the user. When camera 100 is connected to the internet 750, camera 100 accesses ID server 760, notifying ID server 760 that it is now "on-line". Camera 100 informs ID server 760 of its current internet address. ID server 760 updates registry 1001 accordingly. As described above, this internet address is different for each time camera 100 is connected to the internet 750. Each time ID server 760 is notified that the digital camera is online, the registry 1001 is updated with camera 100's current internet address.

Subsequently, when user 720 attempts access to camera 100, user 720's web browser first accesses ID server 760. If camera 100 is on-line, ID server 760 finds a corresponding entry in registry 1001, and returns the correct address (e.g., address 1002) to the web browser. Using the address, the web browser subsequently accesses camera 100. If camera 100 is not on-line, the web browser notifies user 720, by, for example, displaying an appropriate message (e.g., DNS entry not found). This process can be implemented in a manner which is transparent to user 720. For example, once camera 100 is registered within registry 1001, user 720's web browser can access ID server 760 automatically to obtain the "current" internet address camera 100 and subsequently access camera 100 in a single user step (e.g., by clicking on a "bookmark" associated with the camera or by "typing in" the camera's identifier).

Similarly, ID server 760 can also maintain user 720's email address within registry 1001 (e.g., within user info 1003). In so doing, camera 100 will be able to notify user 720 of preprogrammed events (e.g., a camera malfunction, such as low battery power) or other such information by sending an appropriate email message.

It should be appreciated that there are many variations of service possible using this scheme. For example, camera 100 can be configured to automatically notify user 720 via ID server 760 when camera 100 is on-line. Alternatively, ID server 760 may itself notify user 720 when it is on-line with new pictures for viewing (e.g., via a page or telephone call). Any particular variation can be implemented depending upon the particular functionality desired by a user.

For example, security can be enhanced by maintaining a system of passwords between camera 100 and user 720. When user 720 accesses ID server 760, user 720 might be required, for example, to enter appropriate user authorization information, such as, for example, a user ID and password. Similarly, when camera 100 accesses ID server 760, it might also be required to provide a "device ID" and a password. Using this information, ID server 760 can ensure only authorized users are coupled to authorized devices.

Alternatively, security can be maintained by camera 100 in addition to, or instead of, ID server 760. Once camera 100 has notified the ID server 760 that it is on-line, it services all of requests for access. However, full access (e.g., access to the functionality of the camera) is accorded only to those users having appropriate authorization information (e.g., user ID and password). Whereas and unauthorized user attempting access might receive an appropriate message (e.g., an "access denied" web page), an authorized user would see a web page representative of the functionality of the camera. The web page could include, for example, control buttons for camera control, images, or the like.

It should be noted that the first time ID server 760 is accessed, user 720 may be prompted to enter appropriate information (e.g. device ID, password information, etc.) to initialize and set up the service. This information uniquely identifies both user 720 and camera 100. The initialization can be made completely automatic beyond user 720 entering the appropriate information. Once the initialization process is completed, the operation of user 720's web browser with ID server 760 would proceed transparently with respect to user 720.

Figure 11:
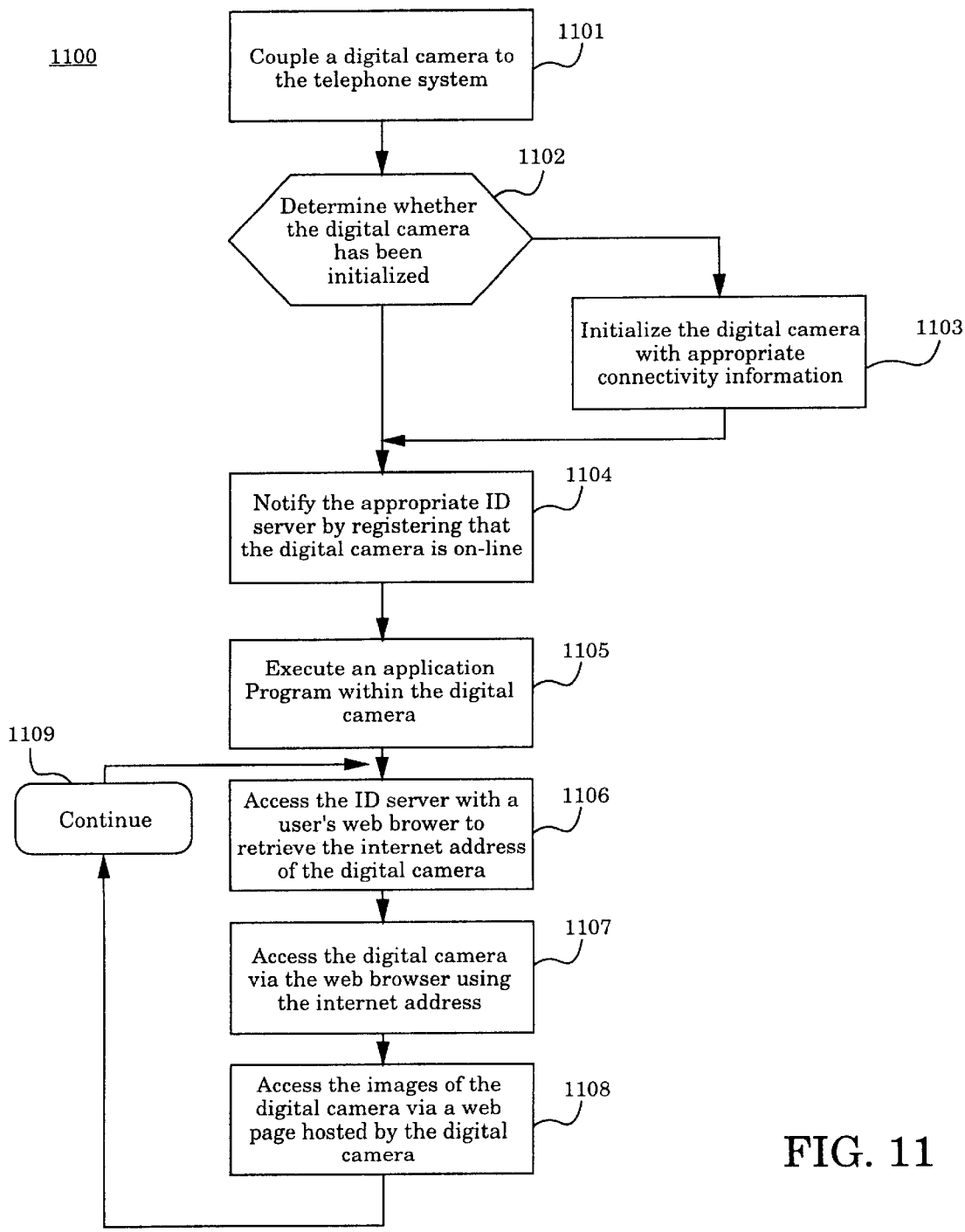
FIG. 11 shows a flow chart of a process in accordance with one embodiment of the present invention.

With reference now to FIG. 11, a flow chart of a process 1100 in accordance with one embodiment of the present invention is shown. Process 1100 shows the steps of an operating process of remotely accessing images taken by and stored within a digital camera of the present invention (e.g., camera 100) by accessing a web page hosted by the digital camera.

Process 1100 begins in step 1101, where a digital camera in accordance with one embodiment of the present invention is coupled to the telephone system. As described above, the digital camera couples to the telephone system via either an internal hardware modem, an internal software based modem, or an external modem. In this manner, the digital camera connects to the telephone system directly, such that a separate, dedicated computer system (e.g., a personal computer) is unnecessary.

In step 1102, the digital camera determines whether it has been previously initialized. As described above, if the digital camera has been previously initialized, the appropriate identification and password information has been previously entered by the user such that, in the present embodiment, the connection to the internet is entirely automatic. The camera uses a dial up connection from the user's ISP to access the internet and process 1100 proceeds to step 1104. If the digital camera has not been previously initialized (e.g., as is the case when the digital camera is newly purchased by the user), the communications routines used by digital camera need to be specified by the user and process 1100 proceeds to step 1103. These routines includes specific information the camera needs to connect to the internet (e.g., dialing prefixes, ISP phone number, passwords, and the like).

In step 1103, the digital camera is initialized with appropriate connectivity information. This information includes for example, dialing prefixes, ISP connection information, passwords, user ID information, device ID information, and the like. This information enables the digital camera to automatically connect to the internet, as needed. As described above, in the case where the digital camera is coupled to the internet via some other means, (e.g., ethernet connection via a firewall) the connectivity information changes accordingly.

In step 1104, once connected to the internet, the digital camera notifies the ID server 760 that is currently on-line. As described above, this involves registering its current internet address with the ID server 760.

In step 1105, the application programming within the digital camera implements the user's application. As described above, the system of the present invention is capable of implementing a wide variety of remote access, remote imaging/surveillance applications. In the present embodiment, the digital camera merely records successive images for remote access by the user. The images are loaded into the camera's memory on a FIFO basis, with the earliest recorded image being replaced by the.latest recorded image. The number of images available to the user depends upon the amount of installed memory in the camera. The digital camera periodically accesses the internet via the ISP (e.g., at the top of every hour) to allow the user to access and retrieve the stored images.

In step 1106, the user, or another "web surfer", accesses the ID server 760 with a web browser to retrieve the internet address of the digital camera. As described above, the ID server 760 solves the unknown.address problem, wherein the digital camera receives a different internet address from the ISP each time it connects to the internet. As described above, the user enters the identity of the digital camera into his web browser (e.g., the camera's URL). Using standard internet protocols; ID server 760 is queried with the URL and returns the digital camera's current internet address.

In step 1107, the user's web browser then accesses the digital camera using the camera's current internet address returned from ID server 760. As described above, the digital camera includes the necessary computer resources to function as a web site and host its own internal web server application 910. When accessed by the user's browser, the digital camera transmits HTML (hyper text mark-up language) document files for its web page. As described above, different web pages can be shown to different accessing web browsers depending upon their authorization (e.g., via passwords). For example, as described above, an unauthorized user might receive a web page displaying an "access denied" sign.

In step 1108, the user accesses the images stored within the digital camera via the web pages received from the web server application 910 hosted within the digital camera. As described above, the web page interface of the digital camera provides a readily familiar and intuitive interface for interaction and control of the camera by the user. Depending upon the particular application, the camera's web pages include control buttons, data entry fields, drop down menus, or even more sophisticated objects (e.g., java applets) for interaction with the user. Using these web pages, the user is able to access the functional controls of the camera in addition to the stored images.

In step 1109, process 1100 continues depending upon the particular requirements of the user. For example, as described above, the user can modify the parameters of the application program executing within the camera (e.g., increase or decrease the frequency of image recording). The user can let the application continue running as is. The virtually zero incremental cost of the images allows for many variations.

Thus, the present invention provides a method for making a digital camera and its internally stored images remotely accessible. The present invention enables the digital camera to be set to continuously take pictures of scenes/items of interest and allow a user to access those pictures at any time. The present invention implements remote accessibility via the internet, thus allowing the user to access the digital camera from virtually an unlimited number of locations.

A digital camera in accordance with the present invention does not require an separate, external computer system (e.g., a personal computer) for internet connectivity, thus providing an inexpensive method for making remotely accessible digital cameras widely available. In addition, a digital camera in accordance with the present invention is accessed via the widely used, very familiar web browser. By functioning with typical, widely used web browsers, the present invention provides a simple, intuitive, and familiar interface for accessing the digital camera's functionality. In so doing, the controls and functions of the digital camera are intuitively easy to utilize, and do not require an extensive learning period for new users. The present invention also provides an efficient, user transparent, process of obtaining the internet address of a digital camera, where the camera accesses the internet via a dial-up connection, and thus, has a changing internet address.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for implementing internet access to images stored in a portable digital image capture unit, wherein the portable image capture unit includes a processor coupled to a memory, the method comprising the steps of:
   a) directly capturing an image using the portable image capture unit;
   b) establishing a direct internet connection by the portable image capture unit without requiring a computer system for internet connectivity, wherein a current internet address of the portable image capture unit changes each time the portable image capture unit connects to the internet, wherein the portable image capture unit hosts a web page;
   c) accessing an ID server and registering the current internet address of the portable image capture unit;
   d) accessing the ID server via the internet with a web browser of a user;
   e) retrieving the current internet address of the portable image capture unit from the ID server transparently to the user; and
   f) using the current internet address and the web browser to access the web page hosted by the portable image capture unit in order to access the image from the portable image capture unit.

2. The method of claim 1 wherein step b) further includes the step of coupling the portable image capture unit to the internet via a direct telephone dial-up internet connection.

3. The method of claim 1 further including the step of initializing the portable image capture unit with connectivity information which enables the establishment of a direct dial-up internet connection.

4. The method of claim 1 further including the step of communication authorization information between the portable image capture unit and the web server.

5. The method of claim 1 further including the step of communicating authorization information between the portable image capture unit and the web browser.

6. The method of claim 1 further including the portable image capture unit performing the step of sending an electronic mail message to the user when the portable image capture unit contains the image.

7. The method of claim 1 further including the step of manipulating an object included in the web page to access the image.

8. The method of claim 1 further including the step of manipulating an object included in the web page to access control functions of the portable image capture unit.

9. The method of claim 1 wherein the portable image capture unit is a hand held digital camera.

10. The method of claim 1 wherein the ID server includes the functionality of a domain name server.

11. A system for remotely accessing images stored in a digital portable image capture unit, wherein the portable image capture unit includes a processor coupled to a memory, the memory containing computer readable code, which when executed by the processor cause the portable image capture unit to implement a method, the method comprising the steps of:

a) directly capturing an image;

b) accessing a web server via a direct connection with the internet without requiring a computer system for internet connectivity, wherein a current internet address of the portable image capture unit changes each time the image capture unit accesses the web server via the internet;

c) registering the current internet address of the portable image capture unit with the web server;

d) hosting a web page such that the image can be accessed by a web browser of a user wherein the web browser obtains the current internet address from the web server transparently to the user.

12. The method of claim 11 wherein step b) further includes the step of coupling to the internet via a direct telephone dial-up internet connection.

13. The method of claim 11 further including the step of storing initialization information enabling the establishment of a direct telephone dial-up internet connection.

14. The method of claim 11 further including the step of communicating authorization information to the web server.

15. The method of claim 11 further including the step of authenticating the user prior to providing the web page to the user.

16. The method of claim 11 further including the portable image capture unit performing the step of sending an electronic mail message to the user when the portable image capture unit contains the image.

17. The method of claim 11 wherein the image capture unit is a digital camera.

18. The method of claim 11 wherein the web server is a domain name server.

19. In a portable image capture unit including a processor coupled to a memory, the memory containing computer readable code, which when executed by the processor cause the portable image capture unit to implement a method for providing remote access to an image stored in the portable image capture unit, the method comprising the portable image capture unit performing the steps of:

a) directly capturing an image;

b) coupling directly to the internet via a telephone dial-up internet connection without requiring a computer system for internet connectivity;

c) storing initialization information enabling the establishment of the direct internet connection;

d) accessing a web server via the direct connection to the internet, wherein a current internet address of the portable image capture unit changes each time the portable image capture unit accesses the web server via the direction connection to the internet;

e) registering the current internet address of the portable image capture unit with the web server; and f) hosting a web page such that the image can be accessed by a web browser of a user, wherein the web browser obtains the current internet address from the web server transparently to the user.

20. The method of claim 19 further including the step of communicating authorization information to the web server.

21. The method of claim 19 further including the step of authenticating the user prior to providing the web page to the user.

22. The method of claim 19 further including the steps of: retrieving the internet address of the web browser of the user from the web server; and contacting the user when the portable image capture unit contains images.

* * * * *